Sept. 6, 1932.  F. NIGRA  1,875,484
SCREW EXTRACTOR
Filed Nov. 25, 1930
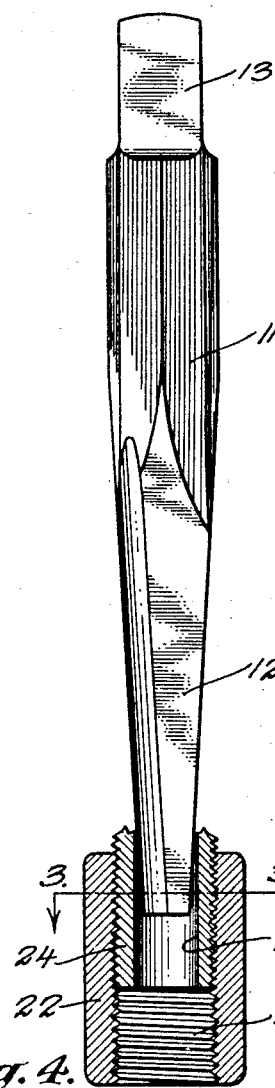
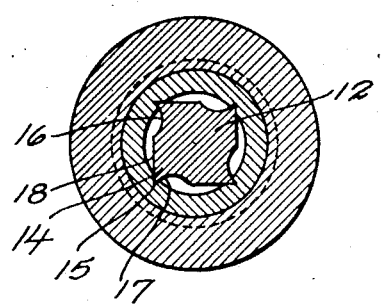
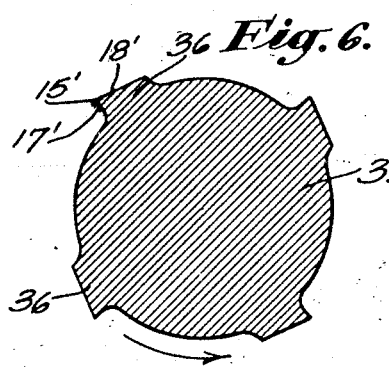
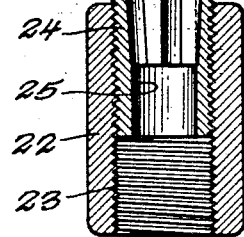
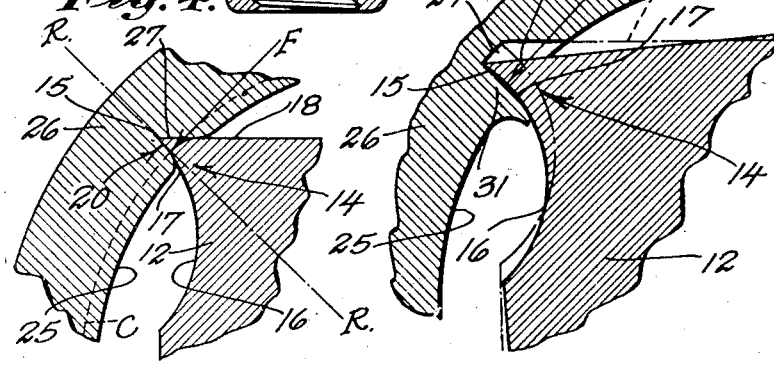
INVENTOR:
FERDINAND NIGRA
BY
ATTORNEY.

Patented Sept. 6, 1932

1,875,484

UNITED STATES PATENT OFFICE

FERDINAND NIGRA, OF LOS ANGELES, CALIFORNIA

SCREW EXTRACTOR

Application filed November 25, 1930. Serial No. 498,013.

This application is directed to the same subject matter as my abandoned application, Serial No. 349,772, filed March 25, 1929, entitled Extractors, and relates to a tool for removing screws from threaded openings.

The general object of the invention is to provide a device for removing damaged and broken off pieces of pipe, pipe nipples, and face bushings from threaded openings, or to remove the remaining portions of screws and studs which have been broken off close to the threaded openings.

Where a threaded pipe or nipple has been broken off in a threaded opening, it is often possible to remove such broken part by driving into the opening thereof a tapered bar of polygonal cross section and rotating the bar in reverse direction, but this simple method of removing a screw is often made difficult by rust or corrosion of the threads or by binding of the threads. Such parts may also be removed by use of one of the screw extracting tools now on the market, the principal one of which consists of a bar having tapering spiral ridges formed in opposite hand to the threads of the threaded part which is to be extracted from a threaded opening. Owing to the fact that these spiral ridges taper, a very decided expansive force is exerted on the threaded part when the tool is turned in the direction necessary to unscrew the threaded part, such expansion of the threaded part causing the threads to bind so as to resist removal. This expanding action is very noticeable where the wall of the threaded member is quite thin.

It is an object of my invention to provide a screw extractor so formed that the rotation thereof in the direction necessary to unscrew the threaded part will produce practically no expansive forces within the threaded part tending to expand such part and thereby bind the threads in a manner to resist removal of the part.

It is an object of the invention to provide an extractor having external ribs provided with edges which taper or converge relative to the axis thereof, for engaging the interior wall of a screw member of the character above described, these edges being so formed that rotation of the extractor within the screw will not produce expansive forces sufficient to materially expand the screw and will not produce reactions which will tend to move the extractor toward a position of disengagement with the screw.

In its simple expression my invention consists of a tapered bar or body of substantially square cross section having grooves formed near the edges thereof so that at the four corners of the bar tapering ribs are formed, these ribs each having a leading face and a following face which meet to form an engagement edge. It is a feature of the invention to so position the leading face relative to the material engaged by the extractor that when the extractor is rotated in proper direction, rotational forces will be transmitted from the extractor to the screw in a direction tangential to the circle on which engagement of the extractor with the screw is made. These tangential rotational forces will also act in a plane substantially perpendicular to the axis of the screw or the axis of rotation, and the reaction to such forces therefore will not be in such direction as to move the extractor outwardly within the screw and thereby reduce or destroy the rotational engagement established by driving the extractor into the opening of the screw.

My new screw extractor is of extremely simple form and embodies a principle of operation which I have not been able to find in screw extractors of the prior art. It is simple and inexpensive of manufacture but is at the same time more effective than the screw extractors with which I am familiar, such as those mentioned in the foregoing preamble.

Further objects and advantages of the invention will be made evident throughout the following part of the specification.

Referring to the drawing, which is for illustrative purposes only,

Fig. 1 is an elevational view showing my extractor and an example of the manner in which it may be used to extract a screw member from a threaded opening.

Fig. 2 is an elevational view similar to Fig.

1 but showing the screw extractor rotated through an angle of 45°.

Fig. 3 is a slightly enlarged cross section on a plane represented by the line 3—3 of Fig. 1.

Fig. 4 is an enlarged fragmentary cross sectional view showing the conditions produced when the extractor is driven into the opening of a screw member.

Fig. 5 is a view similar to Fig. 4 showing the results of rotation of the extractor in the direction necessary to extract the screw.

Fig. 6 is a cross sectional view illustrating an alternative form of my invention.

In the simple and preferred embodiment of my invention shown in Figs. 1 to 5, I provide a bar or body 11 having a tapered engagement portion 12 and a head 13 formed integrally therewith. The body 11 may be of any desired cross section, but the head 13 is preferably polygonal, such as square, so that it may be readily engaged by a wrench whereby to rotate the screw extractor and thereby produce a desired unscrewing rotation of the screw member which is to be removed from a threaded opening. In this preferred form of my invention, the engagement portion 12 is of square configuration, as clearly shown in Fig. 3, thereby forming a tapered body having four edge portions, or what will hereinafter be termed ribs 14, on the exterior thereof. Each of these ribs has an engagement edge 15 which converges or tapers relative to the axis of the body 11 and the remaining three engagement edges 15, and in the flats or faces adjacent the engagement edges 15 grooves or flutes 16 are formed in such a manner that each rib 14 has a leading face 17 and a following face 18. From Fig. 4 it will be noted that the outer portion 20 of the leading face 17 extends inwardly in practically the radial direction defined by the radius R—R, whereas the following face 18 lies at an angle of substantially 45° to the radius R—R. By this simple expedient the four ribs 14 of the extractor are provided with leading and following faces 17 and 18 which meet to form engagement edges 15 and are so positioned and directed that the engagement edges will readily penetrate the screw which is to be removed, and the leading faces 17 will transmit to the screw rotational forces of such character that expansion of the screw will not be produced as the result of the transmission thereto of rotational forces.

In Figs. 1 and 2 I show a body 22, such as a pipe coupling, having a threaded opening 23 in which a screw member or screw 24 is retained, such screw 24 being the retained end of a pipe, screw, or bolt which has been broken off. The screw 24 has an opening 25 therein, as in case of the screw 24 consisting of a portion of a pipe or nipple, or the opening 25 may be drilled through the screw 24 where such screw consists of the threaded end of a machine screw or stud. The extractor is employed in the following manner. The extreme lower end of the engagement portion 12 is inserted in the opening 25 and by blows against the head 13 is driven into the opening 25. In Fig. 4 I have shown one of the ribs 14 with its engagement edge engaging the wall 26 of the screw 24 as a result of the driving of the engagement portion 12 into the opening 25. This engagement is caused by the edge portion of the rib 14 being pressed into the metal of the wall 26 in the manner shown so that as a result of such engagement the edge 15 rests in a groove 27 formed thereby in the wall 26. The grooves 16 are all shown disposed adjacent and to the left of the engagement edges 15, thus adapting the extractor for left-hand rotation necessary to remove a right-hand threaded screw. It is understood that for removal of left-hand threaded screws, the extractor will have the leading faces 17 thereof lying to the right of the edges 15 instead of to the left as shown in the illustrations of an extractor for removing right-hand threaded screws. Owing to the fact that the leading face 17 approaches very close to radial position, the direction of the rotational force indicated by the arrow F is tangential to the mean circle of engagement indicated by the dotted line C. Therefore, the force F acts only in a manner to rotate the wall 26 in left-hand direction. In addition to the foregoing, the force F is exerted in a plane perpendicular to the axis of the screw, and therefore the reaction of the screw to the rotational force does not tend to move the extractor outwardly in the opening 25. What actually occurs in the use of my device where the resistance of the screw to rotation is considerable is illustrated in Fig. 5. In this view the original position of a rib 14 is indicated by dotted lines 30. As the rotative force is exerted and the rib 14 rotates toward the position in which it is shown in full lines, the metal wall 31 of the groove 27 is displaced and forced outwardly so that its area of contact with the leading face 17 increases. This displacement of the wall 31 is accomplished without producing any material expansive forces in the screw and produces a body of metal in engagement with the leading face 17 which increases in size until the resistance of the wall 31 to rotation of the rib 14 is equivalent to the resistance of the screw 24 to rotation in the threaded opening 23, at which time the screw 24 will rotate.

An alternative form of my invention shown in Fig. 6, the purpose of which illustration is to clearly bring out the principle of my invention concerned with the providing of substantially straight converging ribs having leading and following faces so disposed that rotational forces will be imparted to a screw without expansive effect, shown in cross section a tapered engagement portion 35 of an extractor, such engagement portion being substantially circular in cross section and having a plurality of ribs 36 thereon, each of these ribs 36 having a leading face 17' and a following face 18' which meet so as to form an outwardly disposed engagement edge 15'. When this engagement portion 35 is driven into an opening, the engagement edges 15' will set themselves in the wall of the opening, and upon rotation of the screw extractor the leading faces or abutments 17' will transmit rotational forces to the wall of the opening without producing any material expansive forces. It is essential that the number of ribs employed be sufficient to transmit a rotational force sufficient to rotate a tightly bound screw without shearing the metal in which the engagement edges are imbedded. Therefore, the invention may be practiced by the use of one or more engagement ribs of the character herein described. I have found in actual practice that four engagement edges are sufficient for the general conditions encountered and that therefore the invention may be practiced to full extent in the use of a form such as shown in Figs. 1 to 5. In the illustrations of this preferred form of the invention I have shown grooves or flutes 16 which form the leading faces 17. These grooves or flutes may be forged in the original forging of the bar of steel from which the extractor is made or may be machined in the extractor after the faces 30 have been ground or otherwise finished.

In this specification I have defined the ribs as being substantially straight. This appears to be the natural form in which to make such ribs, for the reason that the extractor is caused to engage the screw by driving same into an opening in the screw so as to seat the engagement edges. The invention may be practiced with the ribs inclined or spiralled, but this inclination of the ribs should not be so great that the rotational force applied to the extractor would cause the extractor to screw into the opening and thereby produce expansive forces in the screw, as occurs in the use of spiral types of screw extractors now found on the market. Therefore, by the use of the term "substantially straight" I mean approaching straightness to such an extent that the rotational forces will not cause the extractor to screw into the opening and thereby expand the same.

I claim as my invention:

1. An extractor of the character described, comprising: a body having a head adapted to be driven and an engagement portion extending therefrom there being substantially straight ribs on the exterior of said engagement portion for engaging an opening in a screw, said ribs having leading and following faces so disposed that outwardly faced engagement edges are formed on said ribs which converge relative to the axis of the extractor, said leading faces approaching closely to radial position adjacent said engagement edges so that the rotational forces transmitted by said leading faces to the screw will be substantially tangential to the circle of engagement of said ribs with the screw.

2. An extractor of the character described, comprising: a body having a head adapted to be driven and an engagement portion extending therefrom there being substantially straight ribs on the exterior of said engagement portion for engaging an opening in a screw, said ribs having leading and following faces so disposed that outwardly faced engagement edges are formed on said ribs which converge relative to the axis of the extractor, said leading faces being disposed near to radial position than said following faces.

3. An extractor of the character described, comprising: a body having a head adapted to be driven and a square cornered, tapered engagement portion extending therefrom, there being a groove formed at one side of each edge of said tapered engagement portion in a manner to produce a leading face for each edge approaching closer to radial position than the following face of such edge.

4. An extractor of the character described, comprising: a body having a head adapted to be driven and a tapered engagement portion extending therefrom having a plurality of converging faces defining polygonal cross section, there being a groove formed at one side of each edge of said tapered engagement portion so as to provide a substantially radial leading face adjacent each of said edges so that said leading faces will transmit substantially tangential rotative forces to the wall of an opening engaged by said edges.

5. An extractor of the character described, comprising: a body having a head adapted to be driven and a square cross-sectioned, tapered engagement portion extending therefrom, there being grooves of lesser width than the sides of said tapered engagement portion formed at one side of each edge of said tapered engagement portion in a manner to produce a leading face for each edge approaching closer to radial position than the following face of such edge.

6. An extractor of the character described, comprising: a body having a head adapted to be driven and a tapered engagement portion of polygonal cross section extending therefrom so as to form a plurality of engagement edges, there being grooves of lesser width than the sides of said tapered engagement portion formed at one side of each edge of said tapered engagement portion in a manner to produce a leading face for each edge approaching closer to radial position than the following face of such edge.

7. An extractor of the character described, the combination of: a body; a head on one end of said body whereby said body may be driven into an opening; and a plurality of ribs formed on said body, said ribs being parallel to the axis of said body and converging toward the end of said body, said ribs having following edges and leading edges, said leading edges being substantially radial, said ribs being driven into the metal forming said opening when said extractor is driven into said opening, and said ribs exerting a force against said metal at right angles to a radial line extending through said rib when said extractor is rotated.

8. An extractor of the character described, the combination of: a body; a head on one end of said body whereby said body may be driven into an opening; and a plurality of ribs formed on said body, said ribs being parallel to the axis of said body and converging toward the end of said body, said ribs having following edges and leading edges which are curved in a plane at right angles to the axis of said body, said leading edges being substantially radial, said ribs being driven into the metal forming said opening when said extractor is driven into said opening, and said ribs exerting a force against said metal at right angles to a radial line extending through said rib when said extractor is rotated.

In testimony whereof, I have hereunto set my hand at Los Angeles, California, this 20th day of November, 1930.

FERDINAND NIGRA.